June 15, 1954
C. M. VALIENTE
2,680,853
DISCHARGE VALVE FOR TANKS AND
MECHANISM FOR OPERATING SAME
Filed Aug. 1, 1952
2 Sheets-Sheet 1
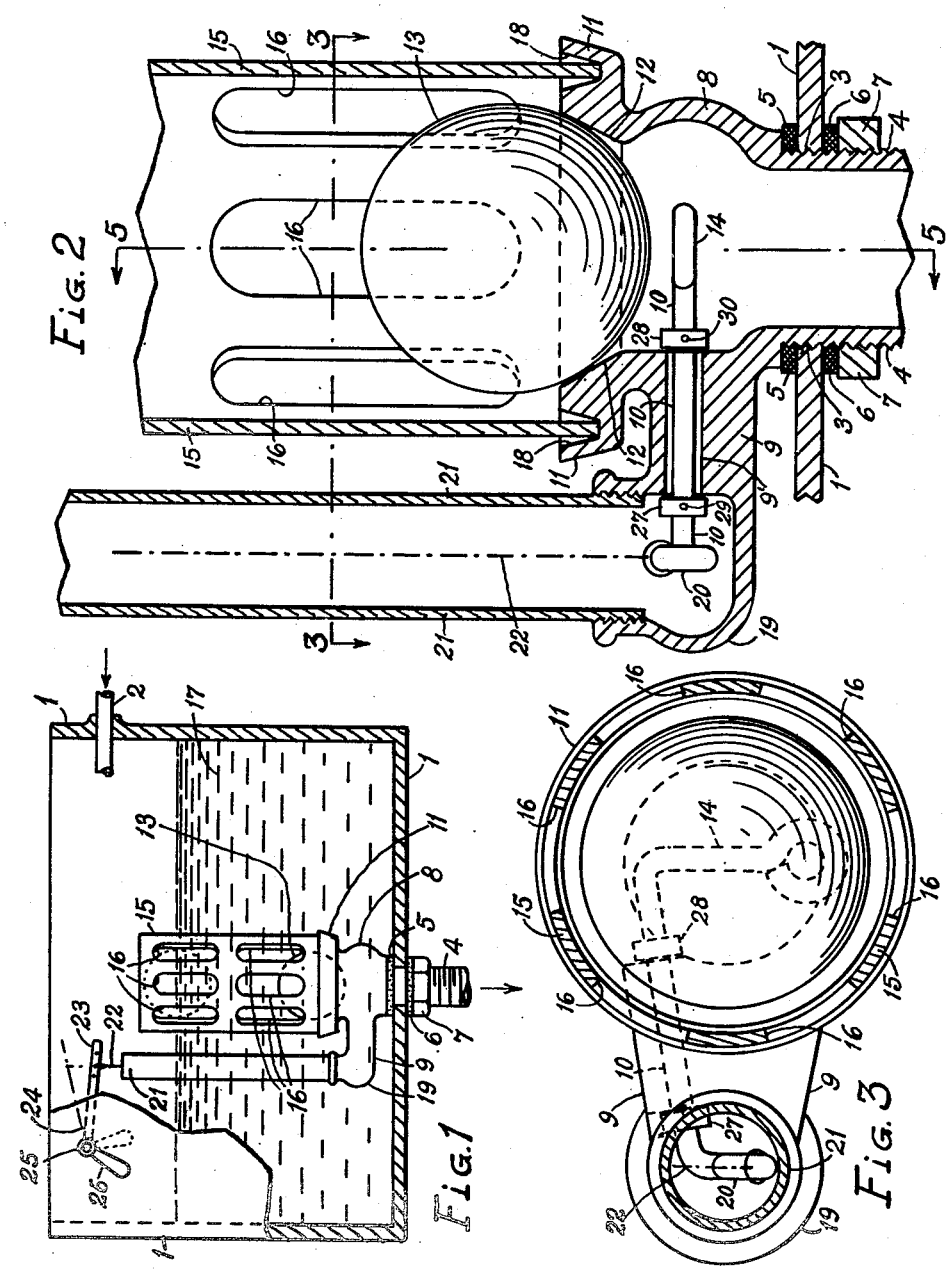
INVENTOR.
Cesar Madera Valiente
BY Zinger, Stern & Carlberg
ATTORNEY.

June 15, 1954
C. M. VALIENTE
DISCHARGE VALVE FOR TANKS AND
MECHANISM FOR OPERATING SAME
2,680,853
Filed Aug. 1, 1952
2 Sheets-Sheet 2
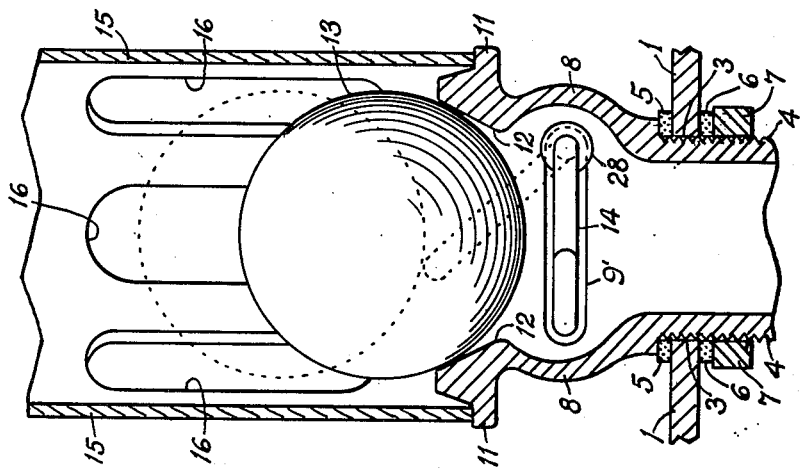
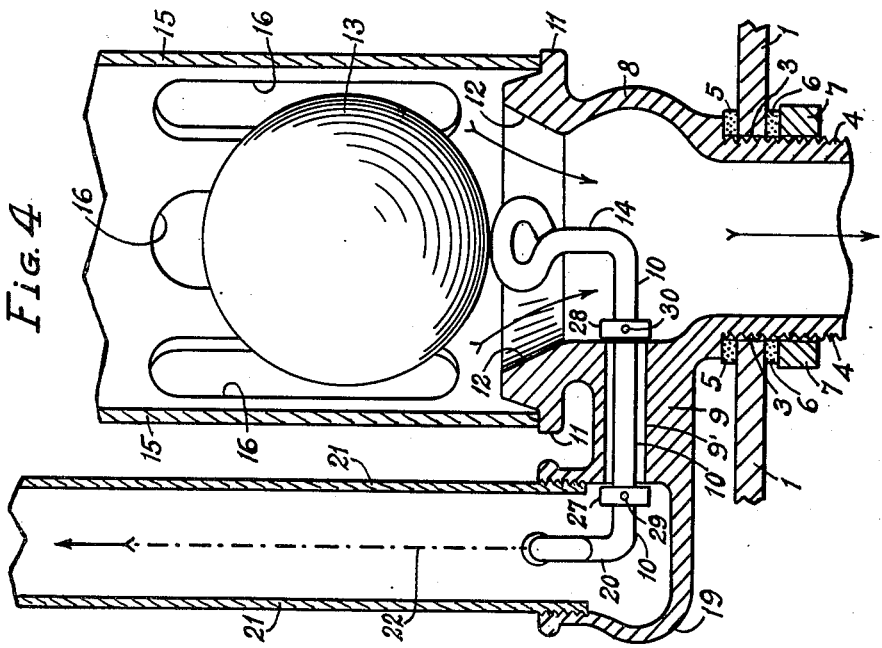
INVENTOR.
Cesar Madera Valiente
BY. Dinger, Stern & Carlberg
ATTORNEY.

Patented June 15, 1954

2,680,853

UNITED STATES PATENT OFFICE 2,680,853

DISCHARGE VALVE FOR TANKS AND MECHANISM FOR OPERATING SAME

Cesar Madera Valiente, Havana, Cuba

Application August 1, 1952, Serial No. 302,041

1 Claim. (Cl. 4—57)

This invention relates to discharge valves for tanks, particularly to liquid discharge valves for watercloset tanks, and it has for its object to provide an improved valve of that kind and the mechanism for operating the same.

The improvement of this invention consists in a loose hollow spherical plain valve, preferably made of rubber, which by its own weight and by the suction action produced by the very discharge of the liquid from the tank is adapted to rest at any segment of the valve within a frustro-conical seat opening formed at the inlet of the liquid discharge conduit that is threadedly secured through a double packing across an opening formed in the lower base of the tank. Tht discharge conduit has formed therein a lateral extension having a passageway within which is mounted a journal bearing for a horizontal swinging shaft ending beneath the valve seat opening in an eyebolt percussor arm whose function upon it being raised or placed in a vertical position is to upwardly strike against the lower portion of the valve, thereby raising the latter and withdrawing it from its seat, thus it permitting the discharge of the water contained in the tank. The ball is loosely guided in its raising and falling movements by a cell that freely rests on the seat opening of the discharge tube and is provided with a plurality of openings.

The ball percussor mechanism is operated by the usual lever and in the use thereof said lever is pivotally supported on a horizontal pivot shaft mounted on one of the tank walls and it has a handle-shaped arm and an eyebolt arm for tying a cable that descends within the usual overflow tube screwed on a thread mouth-piece formed in the lateral extension of the discharge conduit, to be connected by its lower end to an eye in which ends another short eyebolt arm parallel to the percussor arm on the outer end of said swinging shaft. The tank is provided with a float ball operated water supply faucet, as it is usual with the present watercloset tanks, to automatically supply, upon the tank being discharged, the water necessary for re-filling the tank. In this manner there is provided a completely loose valve which omits the usual rod, cable or chain for connection with the operating lever mechanism and which therefore will not be exposed to the difficulties that arise from disengagement of the rod of the complicated mechanism that is at present being used for operation of the valve and which requires frequent repair.

The invention is described with reference to the figures of the accompanying drawings, of which:

Fig. 1 is a longitudinal vertical section view of a watercloset tank provided with the discharge valve and the mechanism for operating the same through the overflow tube, that are the object of this invention.

Fig. 2 is an enlarged vertical section view of the support and guide cell of the valve, with the mechanism for operating the valve, showing the valve in its fallen position or the position in which it obturates the passage of liquid.

Fig. 3 is a horizontal section view of the portions shown in Fig. 2, on line 3—3 of the latter.

Fig. 4 is a vertical section view similar to that of Fig. 3, showing the valve in its raised or liquid discharge position.

Fig. 5 is a vertical section view of the support and guide cell of the valve with the valve operating mechanism, on line 5—5 of Fig. 2 or at a plane perpendicular to the plane of the section shown in Fig. 2.

In the drawings, I indicates a rectangular horizontal cross-section tank of the type usually employed as a watercloset low tank, which is provided with the usual float-operated water fed faucet and which receives the liquid through an inlet tube 2 mounted across an opening in the end wall of the tank I, said faucet and float being not shown as the same do not form part of this invention.

Across an opening 3 formed in the bottom of tank I is mounted the metallic discharge tube for the tank I, which has a reduced section provided with an outer thread 4 which is mounted across said opening 3 through an upper packing ring 5 and a lower packing ring 6, said tube being secured by means of the nut 7 screwed on the end of said tube reduced section 4 exteriorly of the tank I, and the upper section of the discharge tube is an enlarged section having a central belly extension having laterally a passage 9 in which is securely placed a metallic bearing 9 for a metal horizontal swinging shaft 10, said enlarged section 8 extending upwards to form a circular horizontal base 11 provided with a frustro-conical central opening 12 in axial alignment with the reduced tubular section 4 of the discharge tube.

The valve consists in a hollow spherical plain ball 13 preferably made of vulcanized rubber and of a diameter slightly greater than the diameter of the opening 12 at its top edge to freely seat on said opening 12 under the action of its own weight plus the suction produced in the discharge tube by the liquid discharge, and said valve is operated by means of an upward strike that it receives from the interior of the drain tube and that withdraws it from its seat, which is produced by a percussor member formed by an eyebolt arm 14 in which ends the swinging shaft 10 and which is preferably formed by a simple bent of the shaft 10 so that the eye of the bolt 14 will be axially aligned with the central portion of the circular opening 12. The ball 13 is loosely moved upon this opening, it being raised and descended within the wide tube or guide cell 15 open on top and at the bottom and provided at its wall with a series of horizontal openings 16 to allow free flow of the water 17 within the tank 1 towards the opening 12 and the discharge tube 4 as soon as the ball 13 is raised by the percussor member 14, the lower edge of said tube 15 freely resting within an enlarged annular recess 18 formed in the upper face of said top base 11 wherein the seat opening 12 is provided.

The journal bearing 9 is arranged within the horizontal passage 9' connecting the overflow tube 21 with the drain tube 4 and receives the swinging shaft 10. The latter is bent upon itself to form an eyebolt-shaped short arm 20 parallel to the arm 14 and which occupies the central space of the casing 19. At the edge of the top opening of said casing 19 is formed an interiorly threaded mouth-piece to receive the outerly threaded lower portion of the vertical overflow tube 21 within which passes a cable 22 having its lower end connected to the ring of eyebolt 20 and its upper end connected to the ring of another eyebolt 23 forming one of the arms of the usual lever 24 pivotally mounted on a pivot shaft 25 horizontally secured to the fore wall of the tank 1 and having its arm 26 exteriorly of the tank in the shape of a handle.

To operate the percussor mechanism for the ball 13, the swinging shaft 10 is secured in position by means of two collars 27 and 28 secured to the shaft 10 by two pins 29 and 30 adjacently the end vertical faces of the journal 9.

The operation of the ball 13 and the mechanism for operating the same is as follows: Assuming the ball 13 in its fallen position or resting on the seat formed by the frustro-conical opening 12, as it is shown in Figs. 2 and 5 of the drawings, and the swinging shaft 10 in its normal position or with the arms 14 and 20 in horizontal position, and assuming the tank 1 filled with water 17, to operate the tank discharge mechanism the handle 26 of lever 24 is manually pressed to the right hand, whereupon the arm 23 of lever 24 will rotate upwards thereby pulling the cable 22 and causing the power short arm 20 (which forms a lever proper) of the swinging shaft 10 to rotate upwards, thereby also causing the upward rotation of the resistance long arm 14 secured to the inner end of the swinging shaft 10 whose end ring acts as a percussor and violently strikes against the lower portion of the ball 13 causing it to raise on its seat to float within the guide tube 15 up to the surface of the water contained in the tank 1. At this time the water within the tank 1 rushes towards the opening 12 through the openings 16 of said tube 15 and is discharged to the outside through the enlarged square section 8 and the reduced section 4 of the discharge conduit. The gravity and the subsequent suction action produced by the liquid discharge will force the ball 13 to descend and again rest within the opening 12 thereby obturating the passage of fresh liquid fed into the tank 1 by the action of the float that operates the liquid fed faucet.

It is obvious that changes may be made in the size and material of the ball forming the valve as well as in the shape and assembling details of the percussor mechanism for the ball, without thereby altering the essential character of the invention, which is such as claimed hereinafter.

What I claim is:

A discharge valve for tanks, consisting in a vulcanized-rubber big hollow ball loosely resting on a frustro-conical seat opening formed in a circular horizontal base forming the top portion of a top enlarged tubular section which is an extension of the drain tube secured across an opening to the bottom of the valve-carrying tank, said ball being slidably mounted within a cylindrical guide cell laterally opened to the inner space of the tank and resting by its lower edge within an annular recess formed in the top face of said horizontal base, in combination with a mechanism to operate the valve which consists in a horizontal shaft rotatorily mounted on a journal bearing lodged in the conduit communicating the overflow tube with the drain tube, said horizontal shaft ending beneath said seat opening and the enlarged tubular section of the liquid drain tube in an arm ending in an eyebolt adapted to act as a percussor against the lower portion of the ball, said shaft carrying at its opposed end outside said journal bearing another short arm parallel to the former and likewise ending in an eyebolt, and in a lever pivotally mounted on the wall of the valve-carrying tank and having its inner arm secured to the eyebolt end of the second arm of said rotatable shaft through a cable passing within the overflow tube to operate the valve upon a strike of the said percussor member against the lower portion of the valve, thereby allowing the latter to freely rest on its seat by the suction action formed by the very liquid drain through said seat opening.

References Cited in the file of this patent

UNITED STATES PATENTS

| Number | Name | Date |
|--------|------|------|
| 1,054,940 | Rea | Mar. 4, 1913 |
| 1,538,656 | Richardson | May 19, 1925 |
| 1,553,616 | Johnson | Sept. 15, 1925 |
| 2,142,393 | Halteman | Jan. 3, 1939 |
| 2,229,887 | Groeniger | Jan. 28, 1941 |
| 2,430,765 | Garrigan | Nov. 11, 1947 |